(12) United States Patent
Kim et al.

(10) Patent No.: US 11,328,852 B2
(45) Date of Patent: May 10, 2022

(54) COIL DEVICE

(71) Applicant: IHI Corporation, Tokyo (JP)

(72) Inventors: Taewon Kim, Tokyo (JP); Kenji Nishimura, Tokyo (JP)

(73) Assignee: IHI CORPORATION, Tokyo (JP)

( * ) Notice: Subject to any disclaimer, the term of this patent is extended or adjusted under 35 U.S.C. 154(b) by 0 days.

(21) Appl. No.: 17/046,360

(22) PCT Filed: Mar. 4, 2019

(86) PCT No.: PCT/JP2019/008437
§ 371 (c)(1),
(2) Date: Oct. 9, 2020

(87) PCT Pub. No.: WO2019/220744
PCT Pub. Date: Nov. 21, 2019

(65) Prior Publication Data
US 2021/0151238 A1    May 20, 2021

(30) Foreign Application Priority Data
May 17, 2018   (JP) .............................. JP2018-095416

(51) Int. Cl.
| | |
|---|---|
| *H01F 27/22* | (2006.01) |
| *H02J 50/10* | (2016.01) |
| *B60L 53/12* | (2019.01) |
| *H01F 27/02* | (2006.01) |

(52) U.S. Cl.
CPC .............. *H01F 27/22* (2013.01); *B60L 53/12* (2019.02); *H01F 27/025* (2013.01); *H02J 50/10* (2016.02)

(58) Field of Classification Search
CPC ........ H01F 27/22; H01F 27/025; H01F 38/14; H01F 27/28; B60L 53/12; H02J 50/10; Y02T 10/70; Y02T 10/7072; Y02T 90/14
See application file for complete search history.

(56) References Cited

U.S. PATENT DOCUMENTS

| | | | |
|---|---|---|---|
| 6,062,302 A * | 5/2000 | Davis ...................... | F28D 15/02 165/104.26 |
| 7,132,918 B2 * | 11/2006 | Baarman ................. | H02J 50/10 336/188 |
| 2004/0095221 A1 * | 5/2004 | Sigl .......................... | H01F 3/14 336/198 |
| 2012/0186927 A1 | 7/2012 | Suh et al. | |
| 2014/0002228 A1 | 1/2014 | Hatanaka et al. | |
| 2014/0145518 A1 * | 5/2014 | An .......................... | H02J 50/70 307/104 |

(Continued)

FOREIGN PATENT DOCUMENTS

| | | | |
|---|---|---|---|
| CN | 201897255 U | * | 7/2011 |
| EP | 2833508 A | | 4/2015 |

(Continued)

*Primary Examiner* — Pinping Sun
(74) *Attorney, Agent, or Firm* — Volpe Koenig

(57) ABSTRACT

A coil device is installed on an installation object. The coil device includes a housing accommodating at least a coil portion and a heat radiation member coming into thermal contact with the installation object. The heat radiation member includes a main body portion interposed in at least a part of a space between the housing and the installation object and a protrusion protruding from the main body portion toward the installation object.

16 Claims, 6 Drawing Sheets

(56) References Cited

U.S. PATENT DOCUMENTS

| | | | | |
|---|---|---|---|---|
| 2014/0368059 A1* | 12/2014 | Sugawara | ............ | H01F 27/402 |
| | | | | 307/117 |
| 2016/0125997 A1* | 5/2016 | Hwang | .................. | H01F 27/22 |
| | | | | 336/61 |
| 2016/0181860 A1* | 6/2016 | Partovi | ................ | H02J 50/005 |
| | | | | 320/108 |
| 2017/0103850 A1* | 4/2017 | Furiya | ..................... | H01F 21/02 |
| 2017/0129344 A1* | 5/2017 | Islinger | ................ | B60L 53/126 |
| 2018/0025826 A1 | 1/2018 | Nishimura et al. | | |
| 2018/0096773 A1 | 4/2018 | Shijo et al. | | |
| 2018/0166210 A1 | 6/2018 | Araki et al. | | |
| 2020/0194160 A1* | 6/2020 | Tsuchida | ............. | H01F 27/2823 |

FOREIGN PATENT DOCUMENTS

| | | | | |
|---|---|---|---|---|
| EP | 3000934 A1 | 3/2016 | | |
| JP | 2006-128381 A | 5/2006 | | |
| JP | 2009-303316 A | 12/2009 | | |
| JP | 2012-044049 A | 3/2012 | | |
| JP | 2012044049 A * | 3/2012 | | |
| JP | 2013-147142 A | 8/2013 | | |
| JP | 2015-153929 A | 8/2015 | | |
| JP | 2015153929 A * | 8/2015 | | |
| JP | 2016-076636 A | 5/2016 | | |
| JP | 2016-143773 A | 8/2016 | | |
| JP | 2016-171238 A | 9/2016 | | |
| JP | 2017-034029 A | 2/2017 | | |
| JP | WO2016143341 A1 * | 1/2018 | ............. | H02J 50/12 |
| JP | 6413108 B2 * | 10/2018 | | |
| KR | 101345703 B1 | 12/2013 | | |
| KR | 101727465 B1 | 4/2017 | | |
| WO | 2013/145179 A1 | 10/2013 | | |
| WO | 2014/057587 A1 | 4/2014 | | |
| WO | 2016/143341 A1 | 9/2016 | | |
| WO | 2016/194739 A1 | 12/2016 | | |

\* cited by examiner

COIL DEVICE

TECHNICAL FIELD

The present disclosure relates to a coil device.

BACKGROUND ART

A technique related to cooling of a coil device is known in the related art (for example, Patent Document 1). The wireless power transfer device that is described in Patent Document 1 includes a coil enclosed in a resin, a first conductor enclosed in the resin together with the coil, a second conductor, and a radiator attached to the other end portion of the second conductor. One end portion of the second conductor comes into contact with the first conductor in the resin, and the other end portion of the second conductor is exposed to the outside of the resin.

CITATION LIST

Patent Literature

Patent Document 1: International Publication WO2014/057587

SUMMARY

Technical Problem

Patent Document 1 discloses forced cooling in which the radiator is configured as a water-cooling cooling device and natural cooling in which the radiator is buried in the ground. In the natural cooling, a cooling device and the like can be omitted, and thus simplification in configuration can be achieved. In this regard, it is desired in this technical field to improve cooling performance by natural cooling.

The present disclosure describes a coil device capable of improving cooling performance by natural cooling.

Solution to Problem

A coil device according to one aspect of the present disclosure is a coil device installed on an installation object. The coil device includes a housing accommodating at least a coil portion and a heat radiation member coming into thermal contact with the installation object. The heat radiation member includes a main body portion interposed in at least a part of a space between the housing and the installation object and a protrusion protruding from the main body portion toward the installation object.

Effects

According to one aspect of the present disclosure, it is possible to provide a coil device capable of improving cooling performance by natural cooling.

DESCRIPTION OF EMBODIMENTS

Figure 1:
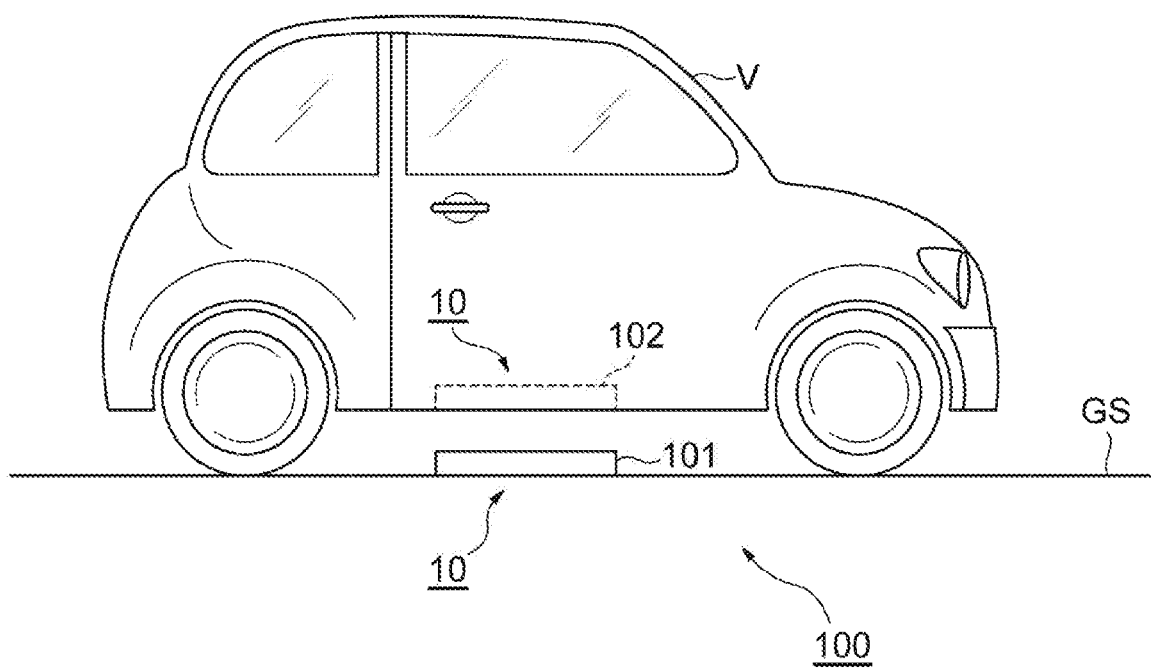
FIG. 1 is a schematic diagram of a wireless power transfer system including a coil device of the present disclosure.

A coil device according to one aspect of the present disclosure is a coil device installed on an installation object. The coil device includes a housing accommodating at least a coil portion and a heat radiation member coming into thermal contact with the installation object. The heat radiation member includes a main body portion interposed in at least a part of a space between the housing and the installation object and a protrusion protruding from the main body portion toward the installation object.

In the coil device according to one aspect of the present disclosure, the main body portion of the heat radiation member is interposed in at least a part of the space between the housing and the installation object. Accordingly, the heat from the housing is transferred to the main body portion. The heat radiation member comes into thermal contact with the installation object. The heat radiation member includes the protrusion protruding from the main body portion toward the installation object. Accordingly, the heat transferred to the main body portion is radiated to the installation object via the protrusion. As a result, heat radiation from the housing to the installation object is promoted. As a result, it is possible to improve cooling performance by natural cooling.

In several aspects, the protrusion may be a plurality of wall portions protruding from the main body portion toward the installation object. In this case, the plurality of wall portions effectively increase the heat radiation area of the heat radiation member. Accordingly, the cooling performance by natural cooling can be further improved.

In several aspects, the installation object may include a ground surface and ground, at least a part of the wall portion may be buried below the ground surface, the wall portion may include a plurality of first wall portions extending along the main body portion and a plurality of second wall portions intersecting with the first wall portions, and a gap defined by the first wall portion and the second wall portion may be filled with a filling material. In this case, heat radiation to the ground is realized mainly by heat radiation via the filling material with which the gap is filled. Accordingly, heat radiation to the ground may not use the convection of a fluid such as air in the gap. Accordingly, it is possible to adopt the configuration of the first wall portion and the second wall portion intersecting with each other and the heat radiation area of the heat radiation member can be further increased.

In several aspects, the main body portion may include a coil support portion supporting the coil portion, and the coil support portion may include an eddy current reduction portion reducing an eddy current generated by the coil portion. In this case, the eddy current generated by the coil portion is reduced by the eddy current reduction portion, and thus heat generation of the heat radiation member itself is suppressed. Accordingly, it is possible to suppress an increase in the size of the heat radiation member.

In several aspects, the housing may further accommodate a circuit board, and the main body portion may include a circuit board support portion supporting the circuit board. In this case, the circuit board can be accommodated in the housing by the circuit board support portion. Further, heat radiation from the circuit board as a heat source to the installation object is promoted via the circuit board support portion. Accordingly, the circuit board can be efficiently cooled.

In several aspects, a protrusion amount of the protrusion with respect to a reference plane along the main body portion may increase from a peripheral edge portion of the main body portion toward a middle portion of the main body portion. In this case, the outer shape of the protrusion of the heat radiation member approaches the three-dimensional shape of, for example, a cone having a central axis passing through the middle portion of the main body portion. Accordingly, the heat radiation area of the heat radiation member substantially increases, and thus heat radiation from the heat radiation member to the installation object is promoted as compared with a case where the protrusion amount is constant. As a result, it is possible to further improve the cooling performance by natural cooling.

In several aspects, the protrusion may include an installation protrusion coming into contact with the installation object. In this case, the installation protrusion that functions as the heat radiation member is also capable of functioning as an installation stand for installing the coil device in the installation object.

In several aspects, the housing may have a box shape including an opening portion opening to the installation object side and include a facing surface extending along an edge of the opening portion and facing the main body portion, and the main body portion may include an abutment surface abutting against the facing surface at the edge of the opening portion. In this case, the facing surface and the abutment surface abut against each other at the edge of the opening portion, and thus a force acting on the housing can be transmitted to the main body portion. Accordingly, the main body portion is capable of supporting the housing via the facing surface and the abutment surface even when, for example, a force directed to the installation object acts on the housing.

Hereinafter, several embodiments of the present disclosure will be described with reference to the drawings. It should be noted that the same elements will be denoted by the same reference symbols without redundant description in the description of the drawings. The rectangular coordinate system that is illustrated in the drawings may be used in the following description.

First Embodiment

Hereinafter, embodiments of the present disclosure will be described with reference to the drawings. It should be noted that the same elements will be denoted by the same reference symbols without redundant description in the description of the drawings.

Figure 2:
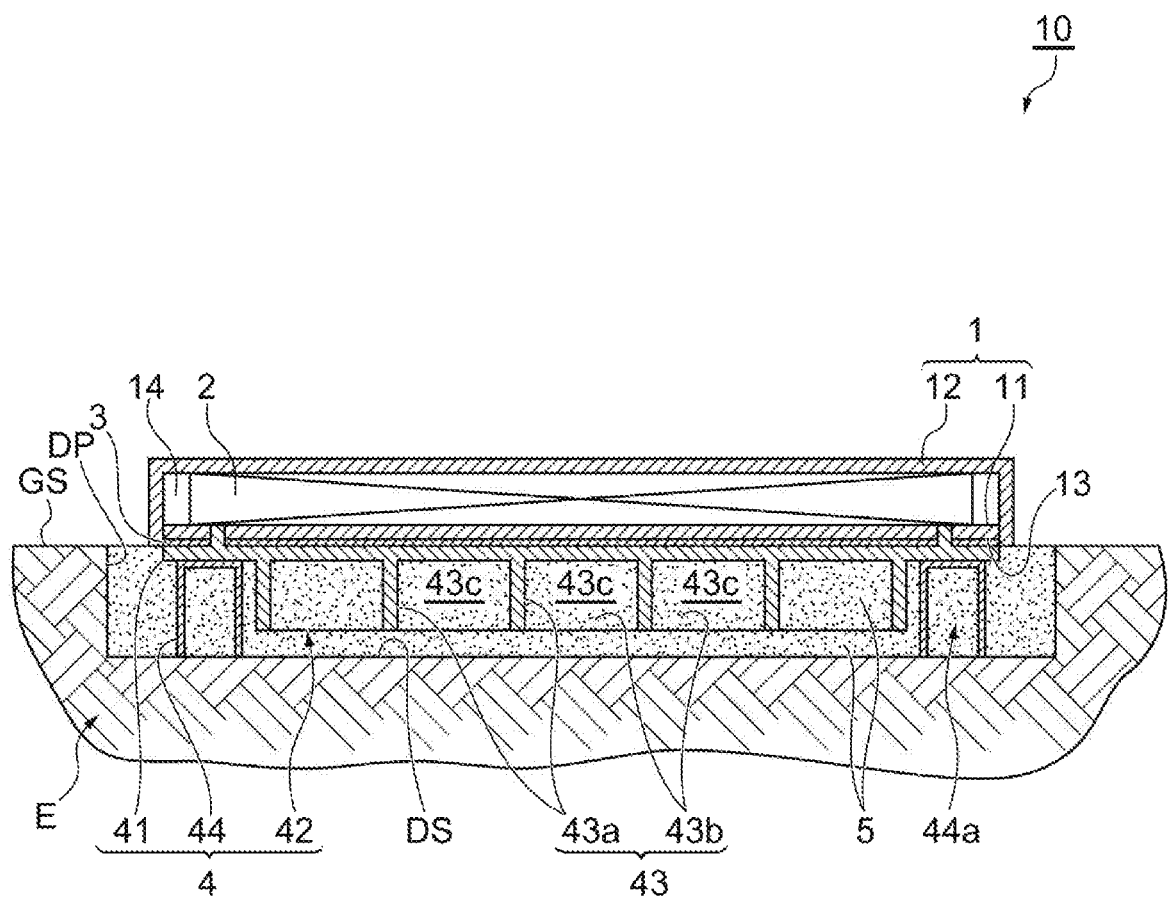
FIG. 2 is a side sectional view of a coil device according to a first embodiment.

First, a coil device 10 according to a first embodiment will be described with reference to FIGS. 1 to 3. FIG. 1 is a schematic diagram of a wireless power transfer system including the coil device of the present disclosure. FIG. 2 is a side sectional view of the coil device 10 according to the first embodiment.

As illustrated in FIG. 1, the coil device 10 is used in, for example, a power transmitter 101 or a power receiving device 102 in a wireless power transfer system 100. The wireless power transfer system 100 is a system for charging a battery installed in a vehicle V such as an electric vehicle and a hybrid vehicle. In the following description of the first embodiment, a second embodiment, and a third embodiment, the coil device 10 that is used in the power transmitter 101 will be described as an example.

An external power source is connected to the coil device 10 as a power transmission coil device via a power transmission circuit, a rectifier circuit, and the like. In the first embodiment, the power transmission circuit, the rectifier circuit, and the like are provided outside, for example, the coil device 10. The power transmission coil device and a power receiving coil device face each other in the up-down direction and internal coils are electromagnetically coupled to each other to form an electromagnetic coupling circuit. As a result, wireless power transfer is performed from the coil of the power transmission coil device to the coil of the power receiving coil device. In other words, the power receiving coil device wirelessly receives electric power from the power transmission coil device. The electromagnetic coupling circuit may be a circuit performing power feeding by the "electromagnetic induction method" or may be a circuit performing power feeding by the "magnetic resonance".

As illustrated in FIG. 2, the coil device 10 has, for example, a flat shape. The coil device 10 is installed on a ground surface GS. At least a part of the coil device 10 is buried below the ground surface GS. The coil device 10 is installed along an installation surface DS in ground E. In other words, the ground surface GS and the ground E below the ground surface GS are installation objects on which the coil device 10 is installed.

The ground surface GS may include a soil surface or may include the surface of a road surface structure such as a pavement. The ground E spreads below the ground surface GS. The ground E may include the soil that spreads below the ground surface GS or may include the part of the road surface structure such as the pavement that is below the ground surface GS. The heat capacity of the ground E is very larger than, for example, the heat capacity of the air around the coil device 10. The heat capacity of the ground E is stable and is affected little by a change in external environment such as a seasonal change.

The coil device 10 includes a housing 1 and a coil portion 2 accommodated in the housing 1. The housing 1 has, for example, a rectangular shape when viewed in the up-down direction (plan view). The housing 1 has a base 11 and a cover 12 fixed to the base 11.

The base 11 is a plate-shaped member disposed on the installation surface DS side in the housing 1 and ensures the rigidity of the coil device 10 as a whole. The surface of the base 11 that is on the installation surface DS side forms a bottom surface 13 of the housing 1. The base 11 is made of, for example, a non-magnetic and electrically conductive material. The base 11 is made of a high-rigidity metal material that is low in magnetic permeability such as aluminum. As a result, the base 11 is capable of shielding an outward flow of a leakage magnetic flux. In other words, the base 11 is a magnetic shield plate.

The cover 12 is a box body disposed on the side that is opposite to the installation surface DS in the housing 1. The cover 12 protects the interior components including a coil. The cover 12 is made of, for example, a non-magnetic and electrically non-conductive material such as an insulating resin. In the coil device 10, the base 11 and the cover 12 form an accommodation space 14 accommodating the coil portion 2.

The coil portion 2 has at least a coil. The coil is, for example, a circular coil. The coil is formed by, for example, a conductive wire wound in a substantially rectangular spiral shape in the same plane. For example, a litz wire in which a plurality of conductor wires insulated from each other are twisted together or the like may be used as the conductive wire. The coil generates a magnetic flux in a case where the coil device 10 is used in the power transmitter 101.

The coil portion 2 may further have, for example, a bobbin and a ferrite core. The bobbin is a flat plate-shaped coil holding member that holds a conductive wire by the conductive wire being wound around the bobbin. The bobbin is made of a non-magnetic and electrically non-conductive material such as an insulating resin. The ferrite core is made of ferrite that is a magnetic body.

In the coil portion 2, the coil, the bobbin, and the ferrite core are, for example, integrally disposed in the accommodation space 14 in the housing 1. The coil portion 2 is a heating element that generates heat by Joule heat or the like during power feeding by means of the coil device 10.

The coil device 10 includes a heat radiation member 4 that dissipate the heat generated in the coil portion 2 by natural cooling. The heat radiation member 4 is attached to the housing 1 via a thermally conductive member 3. The thermally conductive member 3 enhances the adhesion between the housing 1 and the heat radiation member 4 and facilitates heat transfer from the housing 1 to the heat radiation member 4. For example, a silicone sheet or the like can be used as the thermally conductive member 3.

The heat radiation member 4 includes a main body portion 41 provided so as to be interposed between the housing 1 and the installation surface DS and a plurality of protrusions 42 (so-called heat radiation pins) protruding from the main body portion 41 toward the installation surface DS. For example, the heat radiation member 4 is provided so as to come into (direct) contact with a part of the bottom surface of the housing 1 (surface facing the installation surface DS).

The main body portion 41, which is a part of the heat radiation member 4, mainly receives the heat generated in the coil portion 2. The main body portion 41 has, for example, a flat plate shape and has a rectangular shape when viewed in the up-down direction (plan view). The main body portion 41 extends along the bottom surface 13 of the housing 1 so as to, for example, overlap substantially the entire region where the housing 1 is projected in the up-down direction (projection region of the housing 1). At the overlapping part between the main body portion 41 and the housing 1, the heat generated in the coil portion 2 is transferred to the main body portion 41.

The protrusion 42, which is a part of the heat radiation member 4, mainly radiates the heat received from the coil portion 2 to the ground E. As an example, the protrusion 42 is a wall portion 43 protruding from the main body portion 41 toward the installation surface DS. In the coil device 10, at least a part of the wall portion 43 is buried below the ground surface GS. The wall portion 43 is formed integrally with the main body portion 41 and radiates the heat of the main body portion 41 to the ground E. In other words, the heat radiation member 4 is in thermal contact with the ground E.

Figure 3:
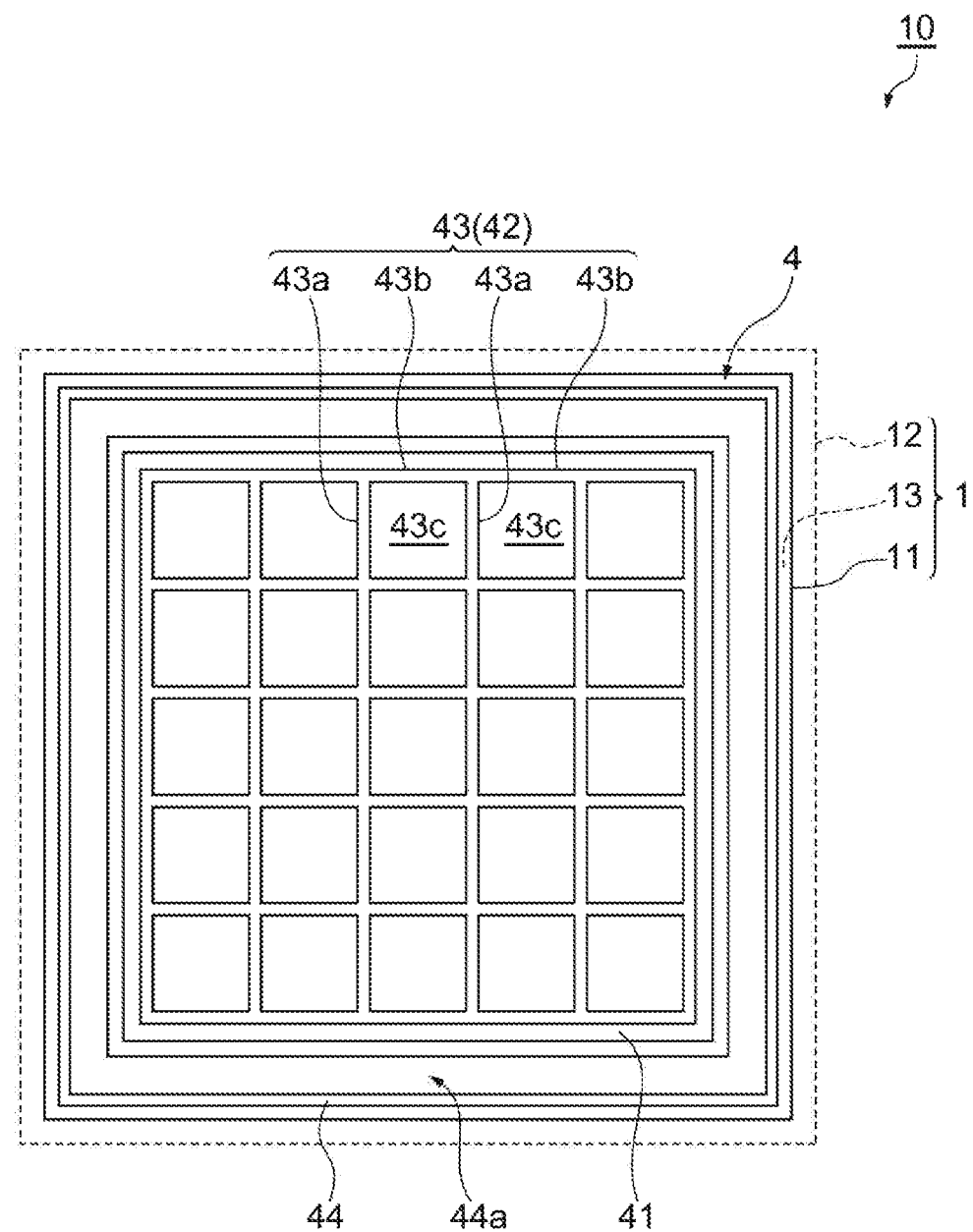
FIG. 3 is a plan view of a heat radiation member of the coil device of FIG. 2.

FIG. 3 is a plan view of the heat radiation member 4 of the coil device 10 of FIG. 2. As illustrated in FIGS. 2 and 3, the wall portion 43 includes a plurality of first wall portions 43a extending along the main body portion 41 and a plurality of second wall portions 43b intersecting with the first wall portions 43a.

The first wall portion 43a is a flat plate extending along a first direction along the main body portion 41. The first direction may be, for example, a direction along one edge of the outer edges of the main body portion 41 (one edge of the rectangular shape). The plurality of first wall portions 43a extend substantially in parallel to each other. The lengths of the plurality of first wall portions 43a are substantially equal. The plurality of first wall portions 43a protrude substantially at right angles to the surface of the main body portion 41 that is on the installation surface DS side. The plurality of first wall portions 43a may protrude so as to be inclined at a predetermined angle with respect to the surface of the main body portion 41 that is on the installation surface DS side.

The second wall portion 43b is a flat plate extending along a second direction, which is a direction along the main body portion 41 and is perpendicular to the first direction. The plurality of second wall portions 43b extend substantially in parallel to each other. The lengths of the plurality of second wall portions 43b are substantially equal. The plurality of second wall portions 43b protrude substantially at right angles to the surface of the main body portion 41 that is on the installation surface DS side. The plurality of second wall portions 43b may protrude so as to be inclined at a predetermined angle with respect to the surface of the main body portion 41 that is on the installation surface DS side. Both end portions of the second wall portion 43b are disposed at the same positions as both end portions of the first wall portion 43a. Accordingly, the first wall portion 43a and the second wall portion 43b form a lattice shape when viewed in the up-down direction (plan view).

The first wall portion 43a and the second wall portion 43b define a plurality of gaps or pockets 43c. Each of the pockets 43c is filled with a filling material 5. The filling material 5 is a member for facilitating heat transfer from the wall portion 43 to the ground E. The filling material 5 is a member higher in heat conductivity than, for example, the soil that constitutes the ground E. Concrete or the like can be used as the filling material 5.

The protrusion 42 includes an installation protrusion 44 that comes into contact with the installation surface DS. The protrusion amount of the installation protrusion 44 with respect to the main body portion 41 is larger than the protrusion amount of the protrusion 42 with respect to the main body portion 41. The installation protrusion 44 functions as the heat radiation member 4 and an installation stand for installing the coil device 10 on the ground surface GS.

The installation protrusion 44 is disposed in, for example, a rectangular frame shape surrounding the wall portion 43 when viewed in the up-down direction. The installation protrusion 44 is constituted by, for example, a metal member (such as an aluminum channel material) that has a U-shaped cross section being combined in a frame shape. The installation protrusion 44 is placed on the installation surface DS such that, for example, the U-shaped cross section opens toward the installation surface DS. A space 44a in the cross section of the installation protrusion 44 is filled with the filling material 5 described above.

The coil device 10 constituted as described above is installed on the ground surface GS such that at least a part of the wall portion 43 of the heat radiation member 4 is buried below the ground surface GS. Specifically, the installation protrusion 44 is fixed to the installation surface DS such that the frame body of the installation protrusion 44 is along a horizontal plane in a state where the installation protrusion 44 is in contact with the installation surface DS. The installation surface DS corresponds to the bottom of a depression DP provided at a predetermined depth from the ground surface GS. Then, the coil device 10 is installed on the ground surface GS by the main body portion 41, the thermally conductive member 3, and the housing 1 being sequentially placed with respect to the fixed installation protrusion 44.

Next, the action and effect of the coil device 10 according to the first embodiment will be described. In the coil device 10, the main body portion 41 of the heat radiation member 4 is interposed in at least a part of the space between the housing 1 and the installation surface DS. Accordingly, the heat from the housing 1 is transferred to the main body portion 41. The heat radiation member 4 comes into thermal contact with the ground surface GS. The heat radiation member 4 includes the protrusion 42 protruding from the main body portion 41 toward the installation surface DS. Accordingly, the heat transferred to the main body portion 41 is radiated to the ground E via the protrusion 42. Here, the heat capacity of the ground E is very larger than, for example, the heat capacity of the air around the coil device 10. The heat capacity of the ground E is stable and is affected little by a change in external environment such as a seasonal change. In a case where the coil device 10 is cooled by natural cooling in this manner, the heat radiation to the ground E is more advantageous than heat radiation to the air around the coil device 10. As a result, heat radiation from the housing 1 to the ground E is promoted. Accordingly, with the coil device 10, it is possible to improve cooling performance by natural cooling.

In the coil device 10, the protrusion 42 is a plurality of the wall portions 43 protruding from the main body portion 41 toward the installation surface DS. The plurality of wall portions 43 effectively increase the heat radiation area of the heat radiation member 4. Accordingly, the cooling performance by natural cooling can be further improved.

The installation objects on which the coil device 10 is installed include the ground surface GS and the ground E below the ground surface GS. At least a part of the wall portion 43 is buried below the ground surface GS. The wall portion 43 includes the plurality of first wall portions 43a extending along the main body portion 41 and the plurality of second wall portions 43b intersecting with the first wall portions 43a. The pocket 43c defined by the first wall portion 43a and the second wall portion 43b is filled with the filling material 5. In this configuration, heat radiation to the ground E is realized mainly by heat radiation via the filling material 5 with which the pocket 43c is filled. Accordingly, heat radiation to the ground E may not use the convection of a fluid such as air in the pocket 43c. Accordingly, it is possible to adopt the configuration of the first wall portion 43a and the second wall portion 43b intersecting with each other and the heat radiation area of the heat radiation member 4 can be further increased.

In the coil device 10, the protrusion 42 includes the installation protrusion 44 that comes into contact with the installation surface DS. As a result, the installation protrusion 44 that functions as the heat radiation member 4 is also capable of functioning as an installation stand for installing the coil device 10 on the ground surface GS.

Second Embodiment

Figure 4:
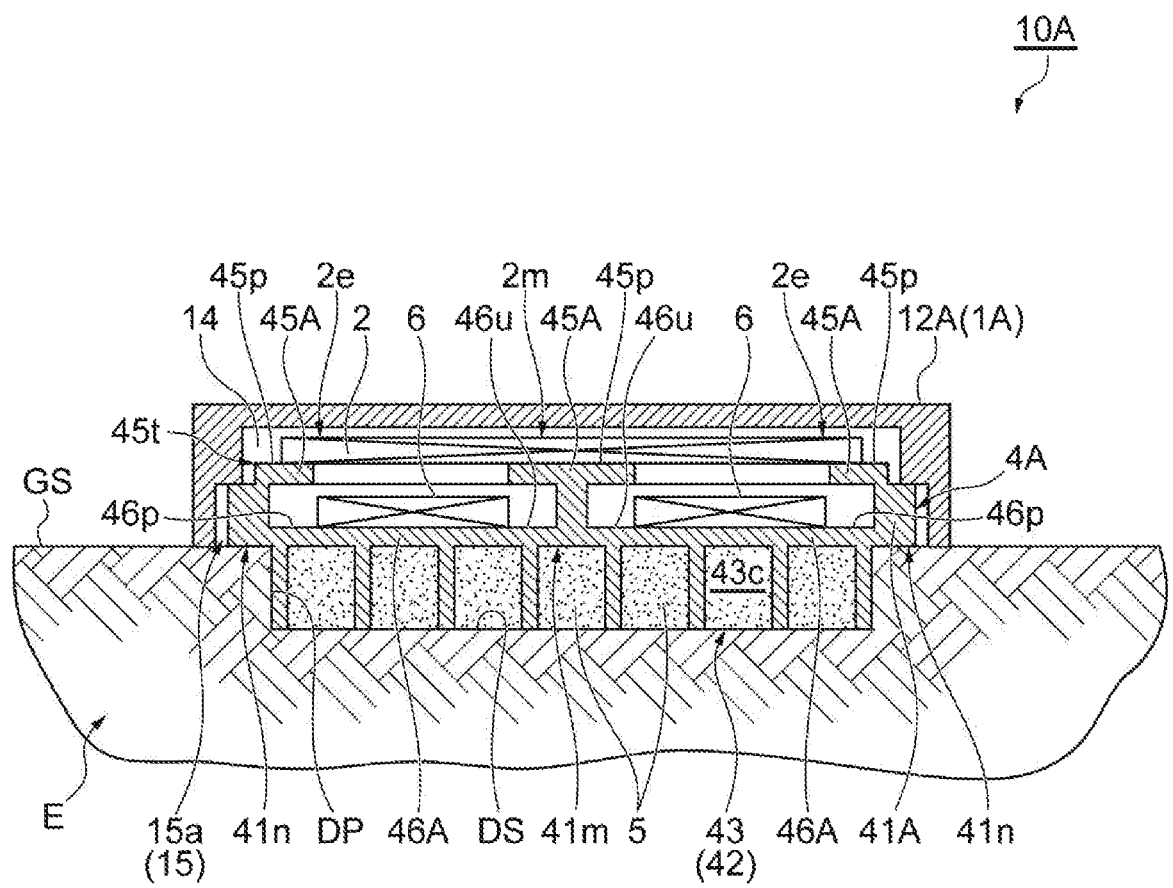
FIG. 4 is a side sectional view of a coil device according to a second embodiment.

A coil device according to the second embodiment will be described with reference to FIGS. 4 and 5. FIG. 4 is a side sectional view of a coil device 10A according to the second embodiment. The coil device 10A is different from the coil device 10 of the first embodiment mainly in that a housing 1A does not include the base 11 and further accommodates a circuit board 6 and a main body portion 41A of a heat radiation member 4A includes a coil support portion 45A supporting the coil portion 2 and a circuit board support portion 46A supporting the circuit board 6. It should be noted that the protrusion 42 of the heat radiation member 4A is similar in configuration to the protrusion 42 of the heat radiation member 4 of the first embodiment.

The housing 1A includes a box-shaped cover 12A, which includes an opening portion 15 opening to the installation surface DS side, instead of the cover 12. The housing 1A has, for example, a rectangular shape (planar shape) when viewed in the up-down direction. An edge 15a of the opening portion 15 has, for example, a rectangular shape smaller than the planar shape of the housing 1A when viewed in the up-down direction (plan view).

The housing 1A further accommodates the circuit board 6. The circuit board 6 includes, for example, a power transmission circuit including a capacitor, a rectifier circuit including an inverter that converts direct current electric power into alternating current electric power (high frequency electric power), a control circuit controlling electric power supply from the power transmitter 101 to the power receiving device 102 of FIG. 1, and the like.

The heat radiation member 4A is disposed in the opening portion 15 of the cover 12A. The heat radiation member 4A is provided such that the main body portion 41A covers the opening portion 15. The main body portion 41A overlaps substantially the entire projection region of the housing 1A when viewed in the up-down direction (plan view). The outer edge of the main body portion 41A reaches the edge 15a of the opening portion 15 when viewed in the up-down direction (plan view). In other words, the main body portion 41A is provided so as to be interposed in at least a part of the space between the housing 1A and the installation surface DS. The main body portion 41A may extend to the outside of the projection region of the housing 1A. The main body portion 41A does not necessarily have to overlap substantially the entire projection region of the housing 1A and may overlap at least a part of the projection region of the housing 1A. In the coil device 10A, the cover 12A and the main body portion 41A form the accommodation space 14 accommodating the coil portion 2 and the circuit board 6.

The main body portion 41A has a plurality of the coil support portions 45A supporting the coil portion 2. The main body portion 41A includes a plurality of the circuit board support portions 46A supporting the circuit board 6. Each of the coil support portion 45A and the circuit board support portion 46A may be formed integrally with the main body portion 41A by, for example, aluminum casting.

The coil support portion 45A has a flat plate portion 45p protruding to the side that is opposite to the protrusion 42 in the main body portion 41A and supporting the coil portion 2 in a tip end portion 45t. The coil support portion 45A is disposed at a plurality of locations, including a peripheral edge portion 41n and a middle portion 41m of the main body portion 41A, such that the flat plate portion 45p supports an edge portion 2e and a middle portion 2m of the coil portion 2. The coil support portion 45A is capable of supporting the coil portion 2 as a whole and more directly receiving the heat generated in the coil portion 2.

The circuit board support portion 46A is provided in a bottom portion 46u of the box-shaped space that is defined by being sandwiched by the plurality of coil support portions 45A. The circuit board support portion 46A is a flat plate portion 46p that extends substantially in parallel to the flat plate portion 45p of the coil support portion 45A in the bottom portion 46u of the space. The plurality of circuit board support portions 46A respectively support a plurality of the circuit boards 6. The circuit board support portion 46A is capable of supporting the circuit board 6 and more directly receiving the heat generated in the circuit board 6.

The circuit board support portion 46A can be accessed via the opening portion that is surrounded by the end edge of the flat plate portion 45p of the coil support portion 45A. The opening portion may be provided with, for example, a lid made of aluminum. In this case, the lid functions as a magnetic shield plate that suppresses the magnetic flux from the coil portion 2 interlinking with the circuit board 6.

Figure 5:
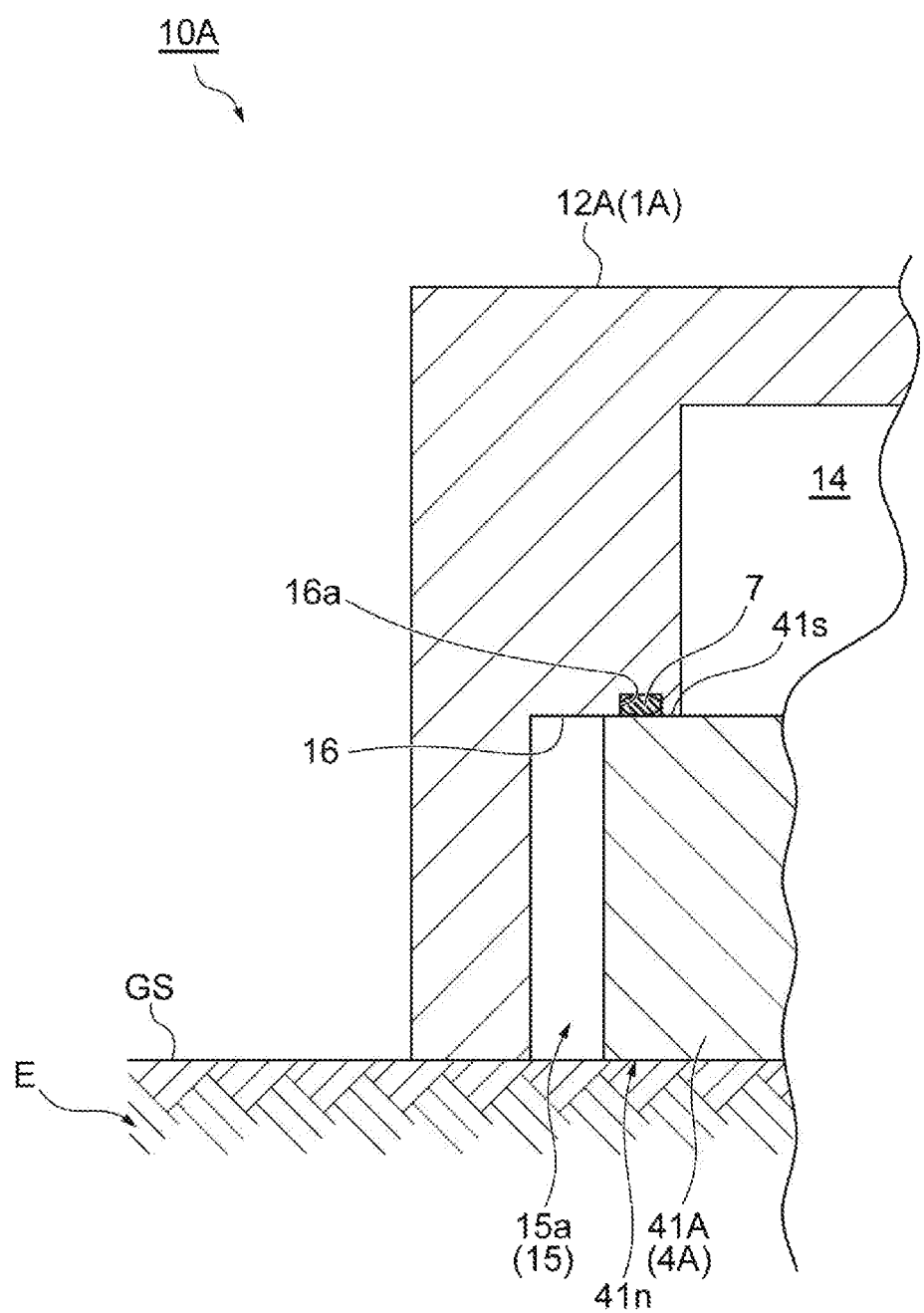
FIG. 5 is an enlarged view illustrating a facing surface and an abutment surface of the coil device of FIG. 4.

As illustrated in FIG. 5, the cover 12A includes a facing surface 16 facing the main body portion 41A of the heat radiation member 4A at the edge 15a of the opening portion 15. The facing surface 16 extends along the edge 15a of the opening portion 15 so as to have, for example, a rectangular shape when viewed in the up-down direction (plan view). A groove 16a extending along the edge 15a of the opening portion 15 is formed in the facing surface 16. A seal material 7 is fitted into the groove 16a. A rubber O-ring having, for example, a shape corresponding to the groove 16a can be used as the seal material 7.

The main body portion 41A includes an abutment surface 41s abutting against the facing surface 16. The abutment surface 41s abuts against the facing surface 16 over, for example, the entire edge 15a of the opening portion 15. As a result, the facing surface 16 and the abutment surface 41s abut against each other, and thus a force acting on the housing 1A can be transmitted to the main body portion 41A. The abutment surface 41s may abut against the facing surface 16 via the seal material 7.

The action and effect of the coil device 10A according to the second embodiment will be described. In the coil device 10A of the second embodiment, the housing 1A further accommodates the circuit board 6. The main body portion 41A includes the circuit board support portion 46A supporting the circuit board 6. The circuit board 6 can be accommodated in the housing 1A by the circuit board support portion 46A. Further, heat radiation from the circuit board 6 as a heat source to the ground E is promoted via the circuit board support portion 46A. Accordingly, the circuit board 6 can be efficiently cooled.

In the coil device 10A, the housing 1A has a box shape including the opening portion 15 opening to the installation surface DS side. The housing 1A includes the facing surface 16 extending along the edge 15a of the opening portion 15 and facing the main body portion 41A. The main body portion 41A is provided so as to cover the opening portion 15 and includes the abutment surface 41s abutting against the facing surface 16. As a result, the facing surface 16 and the abutment surface 41s abut against each other, and thus a force acting on the housing 1A can be transmitted to the main body portion 41A. Accordingly, the main body portion 41A is capable of supporting the housing 1A via the facing surface 16 and the abutment surface 41s even when, for example, a force directed to the installation surface DS acts on the housing 1A.

Third Embodiment

Figure 6:
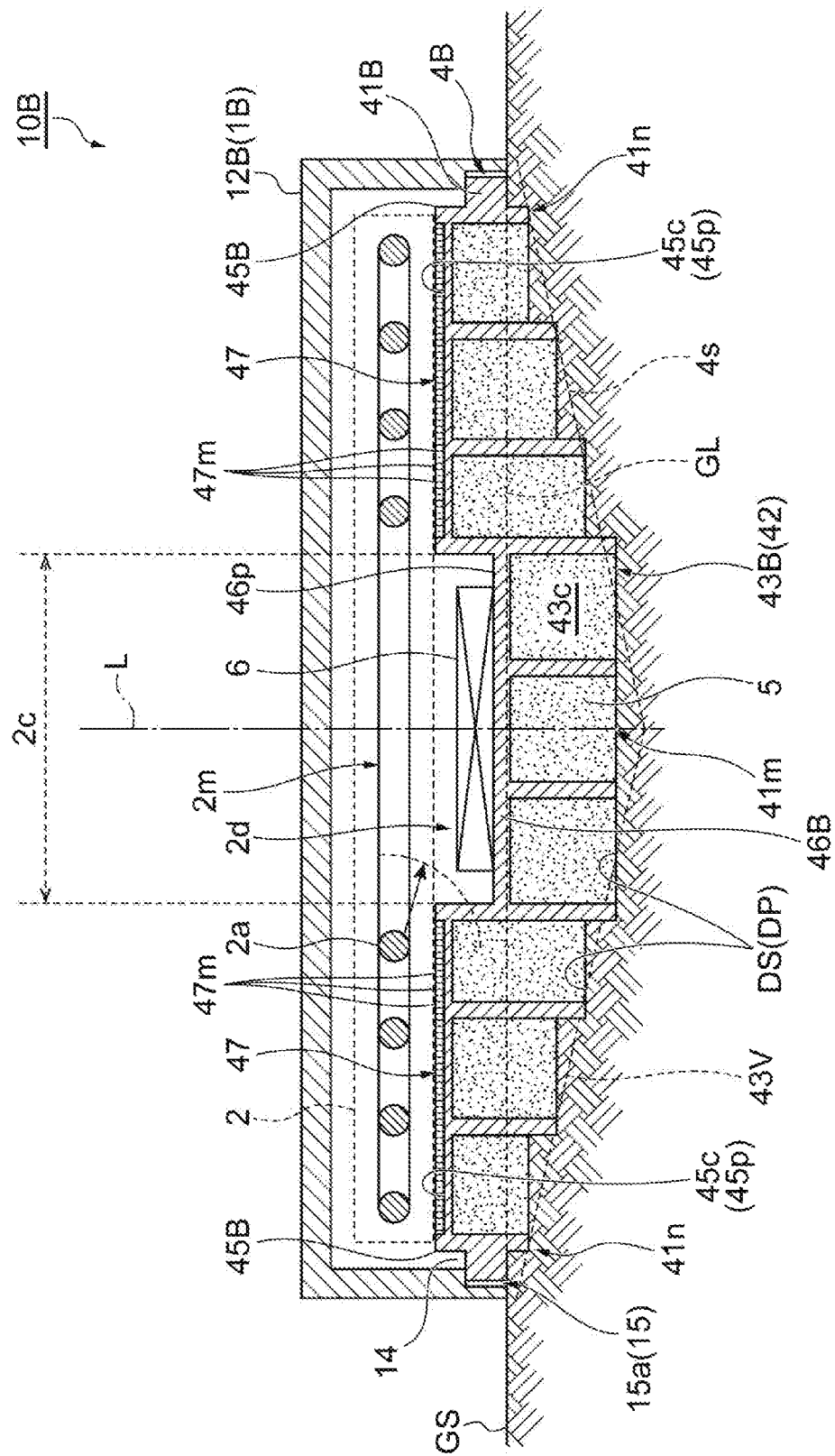
FIG. 6 is a side sectional view of a coil device according to a third embodiment.

A coil device according to the third embodiment will be described with reference to FIG. 6. FIG. 6 is a side sectional view of a coil device 10B according to the third embodiment. The coil device 10B differs from the coil device 10A of the second embodiment mainly in that a main body portion 41B of a heat radiation member 4B has a coil support portion 45B including an eddy current reduction portion 47 instead of the coil support portion 45A, the main body portion 41B has a circuit board support portion 46B different from the circuit board support portion 46A in disposition with respect to the coil portion 2 instead of the circuit board support portion 46A, and the protrusion 42 of the heat radiation member 4B is a wall portion 43B, which protrudes in a different manner from the wall portion 43, instead of the wall portion 43. It should be noted that a cover 12B of a housing 1B is similar in configuration to the cover 12A of the second embodiment. The housing 1B and the main body portion 41B are similar in configuration to the facing surface 16 and the abutment surface 41s of the second embodiment.

The coil support portion 45B includes the eddy current reduction portion 47 reducing the eddy current that is generated by a coil 2a of the coil portion 2. The eddy current reduction portion 47 changes the state of the eddy current that can be generated in the coil support portion 45B. The eddy current reduction portion 47 interrupts a part of the eddy current that is generated by the magnetic flux of the coil 2a.

The eddy current reduction portion 47 is provided in a recess portion 45c formed in the coil support portion 45B. The recess portion 45c is provided in the range in the coil support portion 45B that is below the coil 2a (part where the magnetic flux of the coil 2a is likely to interlink). In the recess portion 45c, a stacked body 47m or the like may be disposed as the eddy current reduction portion 47. Strip-shaped metal plates having a width corresponding to the depth of the recess portion 45c may be stacked in the stacked body 47m. The stacked body 47m is fitted in the recess portion 45c such that the stacking direction is along the surface of the coil support portion 45B. The eddy current reduction portion 47 is not limited to this form, and various configurations interrupting a part of the eddy current that is generated by the magnetic flux of the coil 2a can be adopted. For example, a slit formed in the coil support portion 45B, a through hole formed in the coil support portion 45B, and the like can be adopted as the eddy current reduction portion 47.

As a result, the eddy current that is generated in the eddy current reduction portion 47 by the magnetic flux of the coil 2a can be smaller than, for example, the eddy current that is generated in the coil support portion 45B in a case where the recess portion 45c and the eddy current reduction portion 47 are not formed in the coil support portion 45B.

The circuit board support portion 46B is provided below the middle portion 2m of the coil portion 2. The circuit board support portion 46B is the flat plate portion 46p extending substantially in parallel to the flat plate portion 45p of the coil support portion 45B in the bottom portion of a recess portion 2d provided in a region 2c surrounded by the coil 2a. The circuit board support portion 46B is capable of supporting the circuit board 6 and more directly receiving the heat generated in the circuit board 6.

The circuit board support portion 46B is separated from the coil 2a that is on the innermost peripheral side by a predetermined distance or more. Accordingly, the magnetic flux generated from the coil 2a is unlikely to interlink with the circuit board support portion 46B. In this case, it is possible to omit covering the recess portion 2d provided in the region 2c surrounded by the coil 2a with a lid functioning as a magnetic shield plate.

In the heat radiation member 4B, the wall portion 43B as the protrusion 42 protrudes in a different manner from the wall portion 43 of the first and second embodiments. Specifically, the protrusion amount of the wall portion 43B with respect to a reference plane GL along the main body portion 41B increases from the peripheral edge portion 41n of the main body portion 41B toward the middle portion 41m of the main body portion 41B.

The reference plane GL is a virtual plane that serves as a reference for defining the protrusion amount of the wall portion 43B regardless of the shape of the main body portion 41B. The reference plane GL may be, for example, a plane substantially parallel to the installation surface DS. In the example of FIG. 6, the reference plane GL is a virtual plane including the abutment part between the main body portion 41B and the ground surface GS. The reference plane GL may be a virtual plane along a part of the surface of the main body portion 41B or may be a virtual plane passing through the main body portion 41B.

In the wall portion 43B, the outer shape of the wall portion 43B approaches, for example, the three-dimensional shape of a cone 43V as compared with a case where the protrusion amount with respect to the reference plane GL is constant. The cone 43V has a central axis L passing through the middle portion 41m of the main body portion 41B. The cone 43V has a shape corresponding to the outer shape of the main body portion 41B as viewed in the up-down direction (plan view). The cone 43V is a quadrangular cone in a case where, for example, the outer shape is a rectangular shape. The cone 43V is a cone in a case where, for example, the outer shape is a circular shape.

As a result, the heat radiation area of the heat radiation member 4B increases as compared with a case where the protrusion amount with respect to the reference plane GL is constant. Specifically, a heat radiation surface 4s of the heat radiation member 4B corresponds to the side surface of the cone 43V having the central axis L. Accordingly, in the heat radiation member 4B, the area of the heat radiation surface 4s increases as compared with a case where the protrusion amount of the protrusion 42 with respect to the reference plane GL is constant, and thus the heat radiation area of the heat radiation member 4B substantially increases. As a result, the radiation range of the heat from the heat radiation member 4B becomes wider than in a case where the protrusion amount of the protrusion 42 with respect to the reference plane GL is constant.

The action and effect of the coil device 10B according to the third embodiment will be described. In the coil device 10B of the third embodiment, the main body portion 41B includes the coil support portion 45B supporting the coil portion 2. The coil support portion 45B includes the eddy current reduction portion 47 reducing the eddy current that is generated by the coil 2a of the coil portion 2. Here, the energy loss (eddy current loss) attributable to the eddy current depends on, for example, the maximum magnetic flux density around the coil 2a or the thickness of the conductor. However, the parameter that is related to the magnetic flux density is directly related to the power transmission and reception performance of the coil device 10, and thus it is difficult to change the parameter. In this regard, it is possible to reduce the eddy current generated by the coil 2a by means of the eddy current reduction portion 47 by providing the eddy current reduction portion 47 in the coil support portion 45B supporting the coil 2a. As a result, heat generation of the heat radiation member 4B itself is suppressed, and thus it is possible to suppress an increase in the size of the heat radiation member 4B.

In the coil device 10B, the protrusion amount of the wall portion 43B with respect to the reference plane GL along the main body portion 41B increases from the peripheral edge portion 41n of the main body portion 41B toward the middle portion 41m of the main body portion 41B. As a result, the outer shape of the wall portion 43B of the heat radiation member 4B approaches the three-dimensional shape of the cone 43V. The cone 43V has the central axis L passing through the middle portion 41m of the main body portion 41B. The cone 43V is, for example, a cone. Accordingly, the heat radiation area of the heat radiation member 4B substantially increases as compared with a case where the protrusion amount of the protrusion 42 with respect to the reference plane GL is constant. Accordingly, heat radiation from the heat radiation member 4B to the ground E is promoted as compared with a case where the protrusion amount of the protrusion 42 with respect to the reference plane GL is constant. As a result, it is possible to further improve the cooling performance by natural cooling.

Although several embodiments of the present disclosure have been described above, the present invention is not limited to the embodiments described above.

In the above embodiment, an example in which the coil device 10 is used for the power transmitter 101 has been described. The coil device 10 may be used for the power receiving device 102. In a case where the coil device 10 is used for the power receiving device 102, the coil device 10 as a power receiving coil device is installed on, for example, the bottom portion of the chassis of the vehicle V. In this case, the heat radiation member 4 may radiate the heat from the housing 1 to the chassis of the vehicle V by means of the plurality of protrusions 42 protruding from the main body portion 41 toward the bottom portion of the chassis of the vehicle V.

Although the wall portion 43 including the first wall portion 43a and the second wall portion 43b intersecting with each other has been exemplified as the protrusion 42 of the heat radiation member 4, the present invention is not limited thereto. For example, the wall portion 43 may be configured such that the convection of a fluid such as air can be used in some of the gaps 43c. In addition, although the protrusion 42 is the plurality of wall portions 43 protruding from the main body portion 41 toward the installation surface DS, the protrusion 42 may be, for example, a plurality of columnar heat radiation pins protruding from the main body portion 41 toward the installation surface DS.

Although the main body portion 41 overlaps, for example, substantially the entire region where the housing 1 is projected in the up-down direction (projection region of the housing 1), the main body portion 41 may extend to the outside of the projection region of the housing 1. The main body portion 41 does not necessarily have to overlap substantially the entire projection region of the housing 1. In short, the main body portion 41 may overlap at least a part of the projection region of the housing 1.

Although only the installation protrusion 44 comes into contact with the installation surface DS in the first embodiment described above, at least one of, for example, the first wall portion 43a and the second wall portion 43b may come into contact with the installation surface DS in addition to the installation protrusion 44.

Although the coil 2a of the third embodiment is a so-called circular coil, the coil may be replaced with a solenoid coil.

Although the coil device 10 used in the wireless power transfer system 100 for charging the battery installed in the vehicle V has been described as an example in the above embodiment, the present invention is not limited thereto. The coil device 10 can be modified into various forms insofar as heat is radiated from the housing 1 to an installation object by the heat radiation member 4 by the coil device 10 being installed on the installation object.

INDUSTRIAL APPLICABILITY

According to several aspects of the present disclosure, it is possible to provide a coil device capable of improving cooling performance by natural cooling.

REFERENCE SIGNS LIST 1, 1A, 1B: housing, 2: coil portion, 4, 4A, 4B: heat radiation member, 5: filling material, 6: circuit board, 10, 10A, 10B: coil device, 15: opening portion, 15a: edge, 16: facing surface, 41, 41A, 41B: main body portion, 41n: peripheral edge portion, 41m: middle portion, 41s: abutment surface, 42: protrusion, 43, 43B: wall portion, 43a: first wall portion, 43b: second wall portion, 43c: gap, 44: installation protrusion, 45A, 45B: coil support portion, 46A, 46B: circuit board support portion, 47: eddy current reduction portion, DS: installation surface (installation object), E: ground (installation object), GL: reference plane, GS: ground surface (installation object), V: vehicle (installation object).

The invention claimed is:

1. A coil device configured for installation on an installation object, the coil device comprising:
   a housing accommodating at least a coil portion; and
   a heat radiation member coming into thermal contact with the installation object, wherein:
   the heat radiation member includes a main body portion interposed in at least a part of a space between the housing and the installation object and a heat radiating protrusion protruding from the main body portion toward the installation object,
   the heat radiating protrusion includes a plurality of first wall portions extending in a first direction along the main body portion and a plurality of second wall portions extending in a second direction to intersect the plurality of first wall portions and define a plurality of pockets opening toward the installation object,
   the plurality of first wall portions and the plurality of second wall portions are flat plates protruding toward the installation object;
   at least a part of the heat radiating protrusion is buried below ground; and
   the pockets defined by the plurality of first wall portions and the plurality of second wall portions are filled with a filling material.

2. The coil device according to claim 1, wherein the installation object includes a ground surface and the ground below the ground surface.

3. The coil device according to claim 2, wherein the filing material is concrete.

4. The coil device according to claim 1, wherein the main body portion includes a coil support portion supporting the coil portion, and the coil support portion includes an eddy current reduction portion reducing an eddy current generated by the coil portion.

5. The coil device according to claim 4, wherein the eddy current reduction portion is at least one of:
   a stacked body in which strip-shaped metal plates are stacked,
   a slit formed in the coil support portion, and
   a through hole formed in the coil support portion.

6. The coil device according to claim 1, wherein the housing further accommodates a circuit board, and the main body portion includes a circuit board support portion supporting the circuit board.

7. The coil device according to claim 6, wherein the circuit board does not include the coil portion.

8. The coil device according to claim 6, wherein the circuit board support portion is provided in a bottom portion of a space that is sandwiched between a plurality of coil support portions.

9. The coil device according to claim 1, wherein a protruding dimension of the heat radiating protrusion with respect to a reference plane along the main body portion increases from a peripheral edge portion of the main body portion toward a middle portion of the main body portion.

10. The coil device according to claim 1, wherein the heat radiating protrusion includes an installation protrusion portion configured to come into contact with the installation object.

11. The coil device according to claim 10, wherein the installation protrusion portion has a rectangular frame shape surrounding the pluralities of first and second wall portions.

12. The coil device according to claim 11, wherein a protruding depth of the installation protrusion portion from the main body portion is larger than a greatest protruding depth of the pluralities of first and second wall portions.

13. The coil device according to claim 12, wherein the installation protrusion portion has a U-shaped cross section defining an channel opening toward the installation object.

14. The coil device according to claim 10, wherein a protruding depth of the installation protrusion portion from the main body portion is larger than a greatest protruding depth of the pluralities of first and second wall portions.

15. The coil device according to claim 1, wherein the housing has a box shape including an opening portion opening to an installation object side and includes a facing surface extending along an edge of the opening portion and facing the main body portion, and the main body portion includes an abutment surface abutting against the facing surface at the edge of the opening portion.

16. The coil device according to claim 8, wherein the abutment surface abuts against the facing surface in a vertical direction.

* * * * *